(12) United States Patent
Yao et al.

(10) Patent No.: US 6,865,462 B2
(45) Date of Patent: Mar. 8, 2005

(54) SYSTEM AND METHOD FOR INITIAL SYNCHRONIZATION OF STEERING WHEEL AND ROAD WHEELS IN A STEER-BY-WIRE SYSTEM

(75) Inventors: Yixin Yao, Ann Arbor, MI (US); Behrouz Ashrafi, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 28 days.

(21) Appl. No.: 10/444,335

(22) Filed: May 23, 2003

(65) Prior Publication Data

US 2004/0236487 A1 Nov. 25, 2004

(51) Int. Cl.$^7$ .......................... B62D 5/04; G06F 19/00
(52) U.S. Cl. ........................................ 701/41; 701/42
(58) Field of Search ..................... 701/41, 42; 180/443, 180/402, 446

(56) References Cited

U.S. PATENT DOCUMENTS

| | | | | | |
|---|---|---|---|---|---|
| 4,860,844 | A | * | 8/1989 | O'Neil | 180/402 |
| 6,519,549 | B1 | * | 2/2003 | Lin et al. | 702/151 |
| 6,697,680 | B2 | * | 2/2004 | Lin et al. | 700/13 |
| 6,728,615 | B1 | * | 4/2004 | Yao et al. | 701/41 |
| 6,755,276 | B2 | * | 6/2004 | Clephas | 180/402 |
| 2003/0088351 | A1 | * | 5/2003 | Augustine et al. | 701/41 |
| 2004/0024506 | A1 | * | 2/2004 | Augustine | 701/41 |

* cited by examiner

Primary Examiner—Michael J. Zanelli
(74) Attorney, Agent, or Firm—Brinks Hofer Gilson & Lione (57) ABSTRACT

The present invention involves a method for initial synchronization of steering wheel and a road wheels in a steer-by-wire system of a vehicle when the system is first powered. The method includes providing a steering wheel control system and a road wheel control system. The method further includes sensing relative angles and the absolute angles of the steering wheel, road wheel, and right road wheel. The method further includes generating an augmented steering wheel angle, an augmented left road wheel angle, and an augmented right road wheel angle based on the relative angle and initial value of the absolute angles of the steering wheel and road wheels. The method further includes using the augmented steering wheel angle as a feedback signal to the steering wheel control system and the augmented left and right road wheel angles feedback signals to the road wheels control system. The method further includes controlling the steering wheel and the road wheels to perform initial synchronization of the steering wheel and the road wheels, thereby allowing the vehicle to be operable during the initial synchronization.

25 Claims, 4 Drawing Sheets

SYSTEM AND METHOD FOR INITIAL SYNCHRONIZATION OF STEERING WHEEL AND ROAD WHEELS IN A STEER-BY-WIRE SYSTEM

BACKGROUND OF THE INVENTION

The present invention relates to a system and method for initial synchronization of a steering wheel and road wheels in a steer-by-wire system for vehicles.

In vehicle steer-by-wire systems, mechanical linkages between the steering wheel and the front road wheels typically are eliminated. Moreover, the mechanical linkages between the two front road wheels are eliminated in some steer-by-wire systems. Rather, two independent road wheel electric motor actuators may be installed on the vehicle wherein each actuator independently actuates one of the front road wheels. This allows the two front road wheels to be moved independently from each other. Moreover, a steering wheel system based on an electric motor actuator may also be used for providing steering feel and steering command to the road wheels.

Initial synchronization of the steering wheel and road wheels is a basic functional requirement of a vehicle steer-by-wire system. In a typical steer-by-wire system, the initial angular position of the steering wheel and the road wheels are uncertain when the system is first powered. If the steering wheel and road wheels are not initially aligned in a steer-by-wire system, the steering performance of the vehicle will be degraded and the vehicle may not even be operable. Therefore, an initial synchronization or an alignment of the steering wheel and road wheels is necessary to implement in a steer-by-wire system control. Generally, the initial synchronization of the steer-by-wire system in this invention is a process to align the steering wheel and road wheels for operation of the vehicle when a vehicle is first powered.

An ideal initial synchronization process must execute rapidly, must not cause discomfort to the driver and passengers, and must be interruptible by the vehicle driver without any adverse effect to the initial synchronization process. Since these requirements are in conflict, a number of issues may arise during the startup of the vehicle.

Typically, steer-by-wire systems need a certain amount of time to synchronize the steering wheel and the road wheels when it is initially powered. In particular, the initial synchronization time is longer if the initial error between the two road wheels or between the steering wheel and the road wheels is large. Thus, a driver may be required to wait for the initial synchronization process to be completed before the vehicle may be driven away.

To reduce the synchronization process time, the steering wheel and road wheels should be turned to the desired angular positions very rapidly. Thus, the comfort issue for the driver and passengers arises during initial synchronization. Rapid response time means rapid movement of the steering wheel and road wheels. Rapid movement of the road wheels causes a sudden jolt, which may be uncomfortable to the occupants of the vehicle.

Additionally, initial synchronization process may be interrupted by the vehicle driver. The driver may hold and turn the steering wheel when the vehicle is powered. This causes a disturbance and interruption to the initial synchronization process. It may cause the steering wheel and/or road wheels to not align. Therefore, the initial synchronization process is required to operate continuously in the presence of driver interruption.

It is a challenge to realize an initial synchronization strategy with rapid response time, comfortable feel, and driver interruptible function. These requirements are in conflict. It is difficult to satisfy these requirements by only using simple trade-offs among the requirements in the initial synchronization process of steer-by-wire systems.

BRIEF SUMMARY OF THE INVENTION

It is an aspect of the present invention to provide a method of initially synchronizing the steering wheel and the road wheels of a vehicle in a steer-by-wire system wherein the method combines a function of initial synchronization with normal operation of the steer-by-wire system allowing a driver of the vehicle to start-up and operate the vehicle independent of completion of the synchronization.

It is another aspect of the present invention to provide a method for initially synchronizing the steering wheel and road wheels of a vehicle steer-by-wire system wherein the method is driver interruptible and comfortable for occupants of the vehicle.

It is another aspect of the present invention to provide a method for initially synchronizing the steering wheel and road wheels of a vehicle in a steer-by-wire system wherein the method is time independent.

In one embodiment, the present invention includes a method for initial synchronization of steering wheel and road wheels in a steer-by-wire system of a vehicle when the steer-by-wire system is first powered. The method includes providing a steering wheel control system for producing the steering feel to a vehicle driver and for controlling the steering wheel to track a steering wheel reference angle. The method further includes providing a road wheel control system in electrical communication with the steering wheel control system for generating road wheel reference angles based on the steering wheel angle and for controlling the road wheels to track road wheel reference angles. The method further includes sensing relative angles and absolute angles of the steering wheel, the left road wheel, and the right road wheel.

The method further comprises generating an augmented steering wheel angle based on the relative angle and the initial value of absolute angle of the steering wheel, and an augmented right road wheel angle based on the relative angle and the initial value of absolute angle of the right road wheel, and an augmented left road wheel angle based on the relative angle and the initial value of absolute angle of the left road wheel. The method further includes using the augmented steering wheel angle as a feedback signal to the steering wheel control system and the augmented left and right road wheel angles as feedback signals to the road wheel control system. The method further includes controlling the steering wheel and the road wheels for performing initial synchronization of the steering wheel and the road wheels, thereby allowing the vehicle to be operable during the initial synchronization.

Further objects, features and advantages of the invention will become apparent from consideration of the following description and the appended claims when taken in connection with the accompanying drawings.

DETAILED DESCRIPTION OF THE INVENTION

The present invention generally provides a vehicle steer-by-wire system incorporating a synchronization strategy which allows a vehicle to be operable and drivable immediately after the steer-by-wire system is first powered. The present invention provides a solution to conflict among the rapid response time, comfortable feel, and driver interruptible function in the initial synchronization process.

Figure 1:
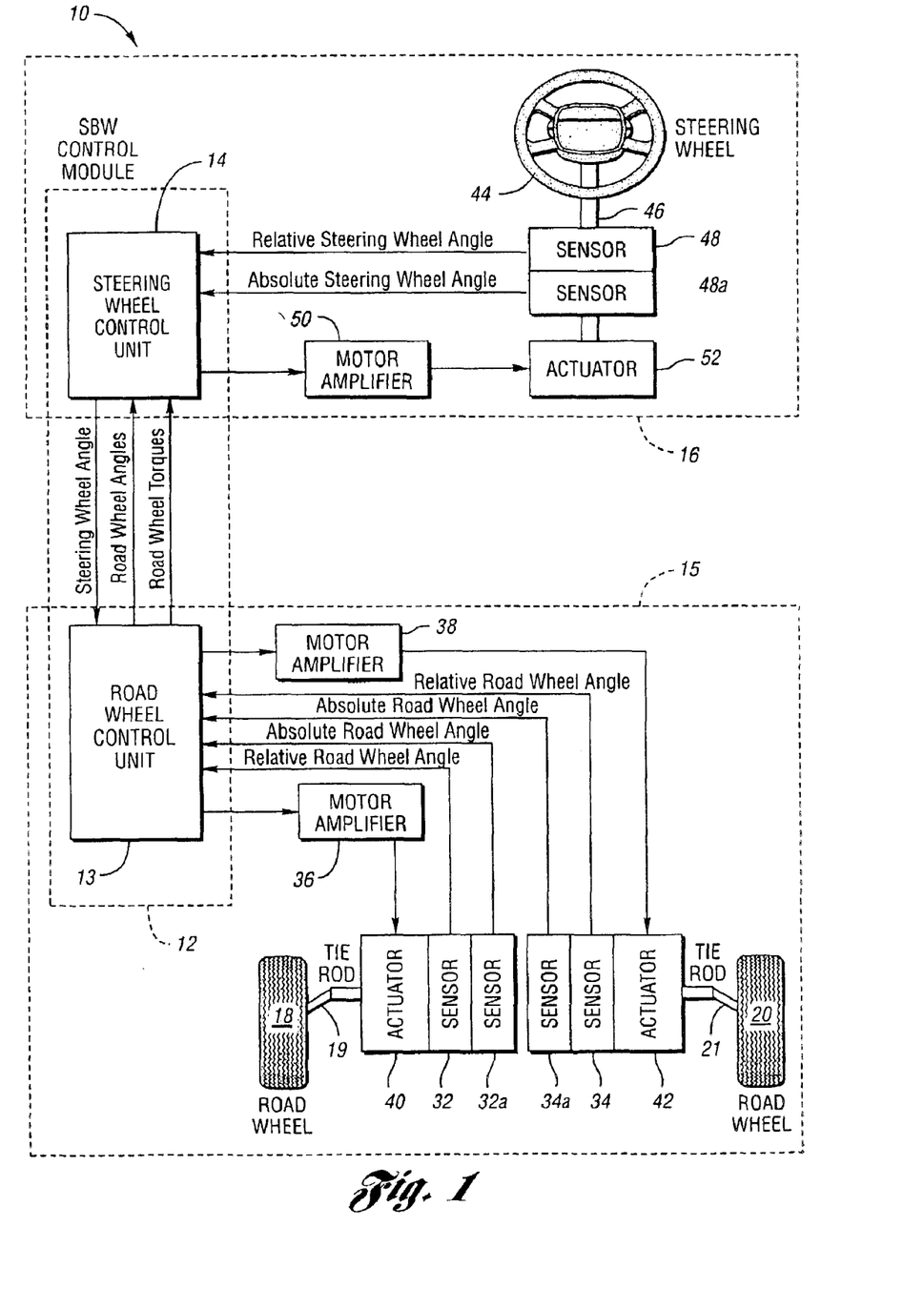
FIG. 1 is a schematic diagram of a vehicle steer-by-wire system in accordance with one embodiment of the present invention.

FIG. 1 illustrates a vehicle steer-by-wire system 10 in accordance with one embodiment of the present invention. As shown, the vehicle steer-by-wire system 10 has no mechanical linkages between the steering wheel and the front left and right front road wheels. In this embodiment, steer-by-wire system 10 is comprised of a road wheel control system 15 and a steering wheel control system 16. Steer-by-wire system 10 includes steer-by-wire control module 12 having a road wheel controller 13 of the road wheel control system 15 and a steering wheel controller 14 of the steering wheel control system 16. Steer-by-wire control module 12 links road wheel control system 15 and steering wheel control system 16.

As shown in FIG. 1, the road wheel control system 15 includes left road wheel 18 connected to a left tie rod 19 and right road wheel 20 connected to a right tie rod 21. Road wheel control system 15 further includes left and right road wheel actuators 40, 42 in electrical communication with left and right motor amplifiers 36, 38, respectively. Left and right motor amplifiers 36, 38 for receiving control signals from road wheel controller 13. Actuators 40, 42 receive current signals from respective amplifiers 36, 38 to produce torques on the left and right road wheels 18 and 20, respectively. Left road wheel angle sensor 32 is attached to left road wheel actuator 40 for determining left road wheel angle. Right road wheel angle sensor 34 is attached to right road wheel actuator 42 for determining right road wheel angle. Left and right road wheel sensors 32, 34 are in electrical communication with road wheel controller 13 for sending signals indicative of left and right road wheels angles to be processed by controller 13. Road wheel controller 13 receives a plurality of input signals including the steering wheel angle and road wheel angles to produce road wheel control signals to control the left and right road wheels 18, 20 using actuators 40, 42, respectively.

Sensors 32 and 34 provide generally relative angle measurements. In this embodiment, absolute angle sensors are used to determine the absolute road wheel angles and as redundancy sensors. Absolute left road wheel angle sensor 32a is attached to left road wheel actuator 40 to sense the absolute left road wheel angle. Absolute right road wheel angle sensor 34a is attached to right road wheel actuator 42 to sense the absolute right road wheel angle. Absolute left and right road wheel sensors 32a, 34a are in electrical communication with road wheel controller 13 for sending signals indicative of absolute left and right road wheel angles to be processed by controller 13.

Steering wheel control system 16 includes steering wheel 44 mounted to steering shaft 46. In this embodiment, steering wheel sensor 48 is mounted to steering shaft 46 or steering wheel actuator 52 for determining a steering wheel angle, and provides generally relative angle measurement. Steering wheel sensor 48 is in electrical communication with steering wheel controller 14, which receives from sensor 48 a signal indicative of steering wheel angle. Steering wheel control system 16 further includes steering wheel motor amplifier 50, which is in electrical communication with steering wheel controller 14 for receiving control signal and for providing a current signal to steering wheel actuator 52. Steering wheel actuator 52 is in electrical communication with motor amplifier 50 for receiving current from amplifier 50 and for producing a reaction torque on the steering wheel 44. Steering wheel controller 14 receives a plurality of input signals including the steering wheel angle signal, road wheel angle signals, road wheel torque signals, and vehicle signals (not shown) and produces a steering wheel control signal.

An absolute angle sensor is used to determine the absolute steering wheel angle and as redundancy sensor. Absolute steering wheel sensor 48a is mounted to steering shaft 46 or steering wheel actuator 52 for sensing the absolute steering wheel angle. Absolute steering wheel sensor 48a is in electrical communication with steering wheel controller 14, which receives from sensor 48a signals indicative of absolute steering wheel angle.

Figure 2:
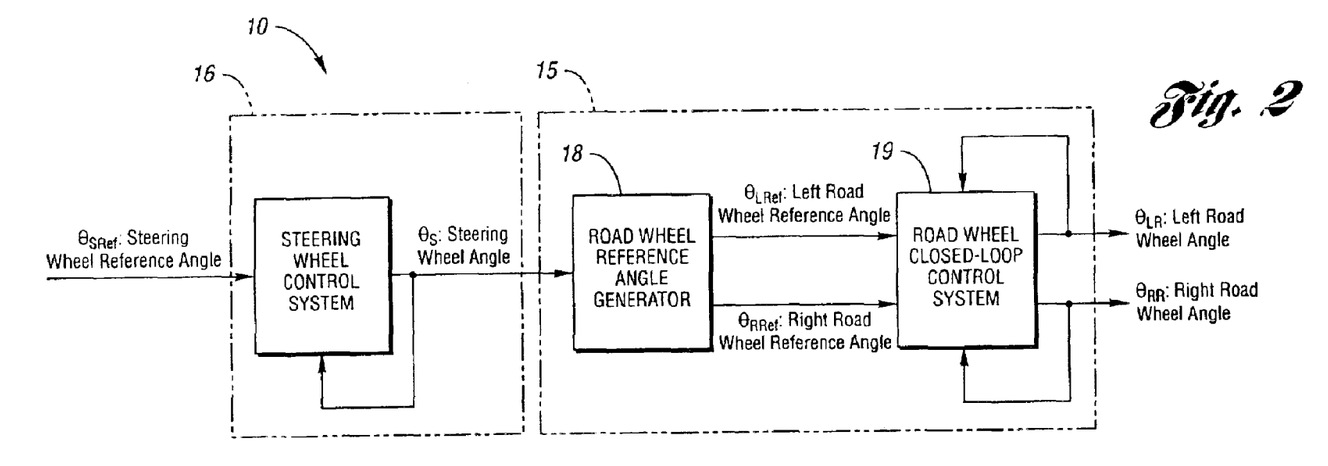
FIG. 2 is a block diagram of a steering wheel control system and a road wheel control system of the steer-by-wire system shown in FIG. 1.

FIG. 2 illustrates a block diagram of the steer-by-wire control system 10 with steering wheel control system 16 and a road wheel control system 15. FIG. 2 is a block diagram description for steer-by-wire system shown in FIG. 1 with steering wheel and road wheel assemblies and controllers. As shown in FIG. 2, steering wheel control system 16 has the steering wheel angle $\theta_S$ as the output and feedback signal, and steering wheel reference angle $\theta_{SRef}$ as its input signal. The road wheel control system 15 has the left and right road wheel angles $\theta_{LR}$ and $\theta_{RR}$ as the output and feedback signals, and left and right road wheel reference angles $\theta_{LRef}$ and $\theta_{RRef}$ as its input signals. In this embodiment, the road wheel control system 15 includes a road wheel reference angle generator 18 and road wheel closed-loop control system 19. The function of road wheel reference angle generator 18 is to generate left and right road wheel reference angles $\theta_{LRef}$ and $\theta_{RRef}$ based on the steering wheel angle $\theta_S$.

The steering wheel control system 16 and road wheel control system 15 in steer-by-wire system 10 are designed to implement the required steering functions. Some functions of steering wheel control system 16 are to provide the steering feel to a vehicle driver and control the steering wheel angle $\theta_S$ to track a steering wheel reference angle $\theta_{SRef}$. Other functions of road wheel control system 15 are to generate road wheel reference angles $\theta_{LRef}$ and $\theta_{RRef}$ based on the steering wheel angle $\theta_S$, and control the road wheel angles $\theta_{LR}$ and $\theta_{RR}$ to track road wheel reference angles $\theta_{LRef}$ and $\theta_{RRef}$.

In addition to the nominal control for steer-by-wire system to perform above-mentioned functions, the steer-by-wire system 10 is also used to perform initial synchronization of the steering wheel and road wheels. The following describes a system and method to perform initial synchronization based on the steer-by-wire system structure in FIG. 2. Initial synchronization of the steering wheel and road wheels of steer-by-wire system, with rapid response time, comfortable feel and driver interruptible features, will not change the structure of the control system of FIG. 2.

The feedback signals $\theta_S$, $\theta_{LR}$ and $\theta_{RR}$ in the steer-by-wire system 10 of FIG. 2 are generated from the measurement of primary sensors 48, 32 and 34 or redundant sensors 48a, 32a and 34a of FIG. 1. By generating the special feedback signals $\theta_S$, $\theta_{LR}$ and $\theta_{RR}$ for the steering wheel control system 16 and road wheel control system 15 in the beginning of initial synchronization, the objective of aligning the steering wheel and left and right road wheels can be achieved.

Figure 3:
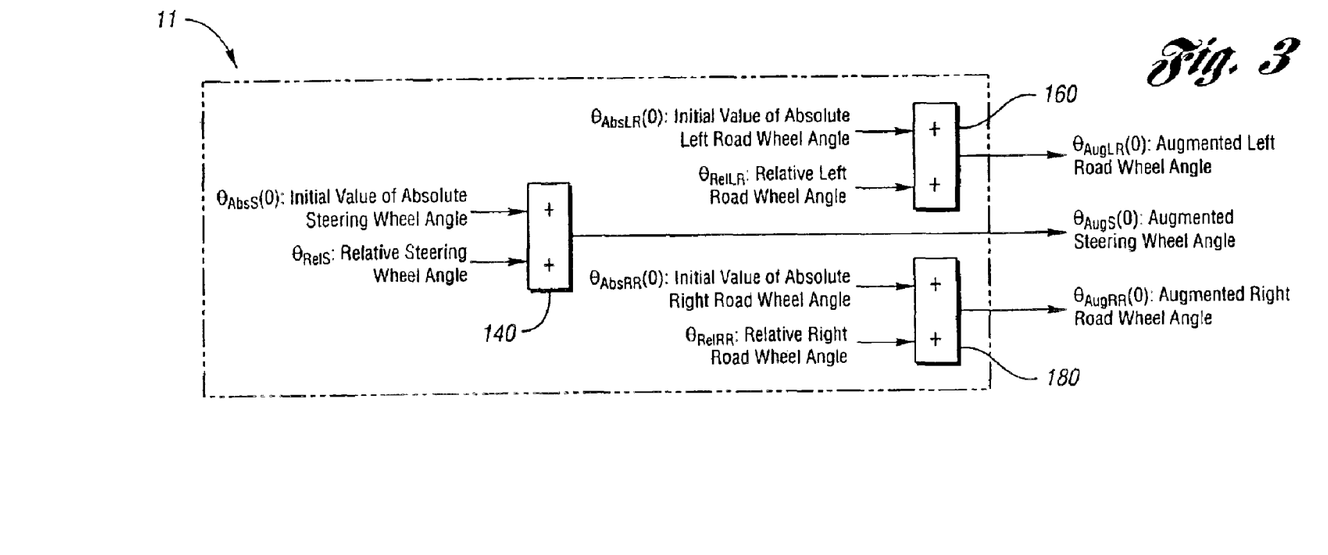
FIG. 3 is a block diagram of an augmented signal generator incorporating the initial synchronization strategy of the steer-by-wire system.

FIG. 3 illustrates a block diagram of an augmented signal generator 11 in order to realize initial synchronization of the steer-by-wire system in accordance with one embodiment of the present invention. The augmented signals of the steering wheel angle and road wheel angles are initial signals of the initial synchronization process. They are generated by the augmented signal generator 11 based on the relative steering wheel and road wheel angles from the relative sensor measurement and initial values of absolute steering and road wheel angles from the absolute sensor measurement.

As shown In FIG. 3, the augmented signal generator 11 generates the augmented steering wheel angle $\theta_{AugS}$, the augmented left road wheel angle $\theta_{AugLR}$ and the augmented right road wheel angle $\theta_{AugRR}$. The augmented steering wheel angle $\theta_{AugS}$ is generated by the summing operator 140 based on relative angle $\theta_{RelS}$ and initial value $\theta_{AbsS}(0)$ of the absolute angle of the steering wheel. The augmented left road wheel angle $\theta_{AugLR}$ is generated by the summing operator 160 based on relative angle $\theta_{RelLR}$ and initial value $\theta_{AugLR}(0)$ of the absolute angle of the left road wheel. The augmented left road wheel angle $\theta_{AugRR}$ is generated by the summing operator 180 based on relative angle $\theta_{RelRR}$ and initial value $\theta_{SbsRR}(0)$ of the absolute angle of the right road wheel.

The augmented steering and road wheel angles shown in FIG. 3 are expressed by the following equations:

$$\theta_{AugS} = \theta_{RelS} + \theta_{AbsS}(0)$$
$$\theta_{AugLR} = \theta_{RelLR} + \theta_{AbsLR}(0)$$
$$\theta_{AugRR} = \theta_{RelRR} + \theta_{AbsRR}(0) \quad (1)$$

where $\theta_{RelS}$, $\theta_{RelLR}$, and $\theta_{RelRR}$ are relative steering wheel and road wheel angles having zero initial values; generally, $\theta_{AbsS}(0)$, $\theta_{AbsLR}(0)$, and $\theta_{SbsRR}(0)$ are initial values of absolute steering wheel and road wheel angles at the beginning of initial synchronization; $\theta_{AugS}$, $\theta_{AugLR}$ and $\theta_{AugRR}$ describe the augmented steering wheel angle and road wheel angles.

The augmented signal generator 11 executes the operation of Equation (1) and provides initial signals for the steering wheel and road wheel control systems using the augmented signals. The steering wheel control system and road wheel control system receive the augmented signals to control the steering wheel and road wheels for initial synchronization.

In this embodiment, the augmented steering wheel angle and road wheel angles $\theta_{AugS}$, $\theta_{AugLR}$ and $\theta_{AugRR}$ are used directly as feedback signals to the steering wheel control system 16 and road wheel control system 15 as shown in FIG. 2 at the beginning of initial synchronization. In another words, the initial angle values of steering wheel angle $\theta_S$, left road wheel angle $\theta_{LR}$ and right road wheel angle $\theta_{RR}$ are formed by the augmented steering wheel angle and road wheel angles $\theta_{AugS}$, $\theta_{AugLR}$ and $\theta_{AugRR}$.

In this embodiment, the following operation is executed at the beginning of the initial synchronization process:

$$\theta_S = \theta_{AugS}$$
$$\theta_{LR} = \theta_{AugLR}$$
$$\theta_{RR} = \theta_{AguRR} \quad (2)$$

As it has been mentioned above, the steering wheel control system 16 and road wheel control system 15 in steer-by-wire system 10 shown in FIG. 2, are designed as feedback control systems in order to make the actual steering wheel and road wheel angles track the corresponding reference angles. More specifically, the steering wheel angle $\theta_S$ tracks its reference angle $\theta_{SRef}$, the left road wheel angle $\theta_{LR}$ tracks its reference angle $\theta_{LRef}$, and left road wheel angle $\theta_{RR}$ tracks its reference angles $\theta_{RRef}$. The wheel tracking error, which is the difference between actual wheel angles and their relative reference angles, are maintained in the set minimal error values, such as 0.05 (degree). As the wheel tracking errors are larger than the required minimal error values, the steering wheel control system and road wheel control system control the steering wheel and road wheels to reduce the wheel tracking errors to maintain the alignment between the steering wheel and road wheels and between the two road wheels.

In this embodiment, the augmented steering wheel angle and road wheel angles $\theta_{AugS}$, $\theta_{AugLR}$ and $\theta_{AugRR}$ are used as feedback to obtain the wheel tracking errors $e_S = \theta_{SRef} - \theta_{AugS}$, $e_{LR} = \theta_{LRef} - \theta_{AugLR}$, $e_{RR} = \theta_{RRef} - \theta_{AguRR}$ for the steering wheel control system 16 and road wheel control system 15 in FIG. 2. The steering wheel control system 16 and road wheel control system 15 in FIG. 2 reduce the wheel tracking errors to implement the initial synchronization for steering wheel and road wheels.

In this embodiment, the nominal control of the steer-by-wire system 10 shown in FIG. 2, will not be affected by the process of initial synchronization using the above-mentioned strategy. The process of initial synchronization is time independent, driver interruptible and comfortable for occupants of the vehicle because the method combines the function of initial synchronization with normal operation of the steer-by-wire system. The initial synchronization strategy allows a driver of the vehicle to start-up and operate the vehicle independent of completion of the synchronization process. Therefore, the conflict among the requirements of an initial synchronization with the rapid response time, comfortable feel, and driver interruptible function is solved.

Figure 4:
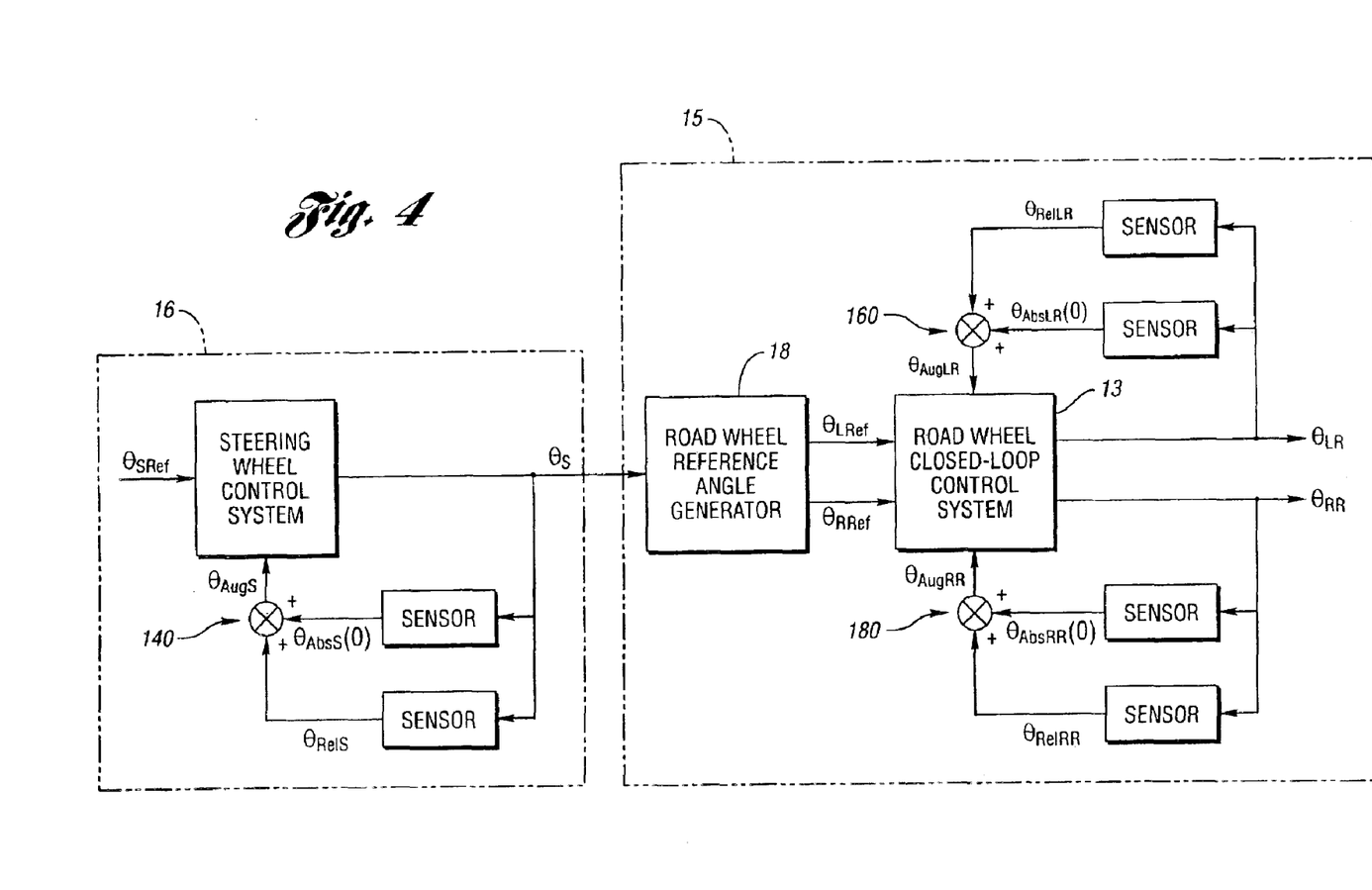
FIG. 4 is a block diagram of the steering wheel feedback control system and road wheel feedback control system incorporating the augmented signals in FIG. 3 to implement initial synchronization.

FIG. 4 illustrates a block diagram of the steering wheel feedback control system 16 and the road wheel feedback control system 15 including the initial synchronization strategy incorporating nominal control system shown in FIG. 2 and the augmented signal generator shown in FIG. 3. FIG. 4 depicts the augmented wheel angles based on the relative angle and initial value of the absolute angle to be fed to the steering wheel and road wheel control system as the feedback angle signals.

As shown in FIG. 4, the actual steering wheel angle $\theta_S$ is formed by the augmented steering wheel angle $\theta_{AugS}$ as a feedback signal for the steering wheel control system 16 based on relative steering wheel angle $\theta_{RelS}$ and initial value $\theta_{AbsS}(0)$ of the absolute steering wheel angle in summer 140. The augmented steering wheel angle $\theta_{AugS}$ is fed to the steering wheel control system 16 to generate a steering wheel tracking error based on the fed steering wheel angle $\theta_{AugS}$ and its reference steering wheel angle $\theta_{SRef}$. The steering wheel tracking error will be reduced to the required minimal error value by controlling of the steering wheel control system 16 such that the steering wheel is initially synchronized and controlled.

As shown in FIG. 4, the actual left road wheel angle $\theta_{LR}$ is formed by the augmented left road wheel angle $\theta_{AugLR}$ as a feedback signal for the road wheel control system 15 based on relative left road wheel angle $\theta_{RelLR}$ and initial value $\theta_{AbsLR}(0)$ of the absolute left road angle in summer 160. The augmented left road wheel angle $\theta_{AugLR}$ is fed to the road wheel control system 15 to generate a left road wheel tracking error based on the fed left road wheel angle $\theta_{AugLR}$ and its reference left road angle $\theta_{LRef}$. The left road wheel tracking error will be reduced to the required minimal error value by controlling of the road wheel control system 15 such that the left road wheel is initially synchronized and controlled.

As shown in FIG. 4, the actual right road wheel angle $\theta_{RR}$ is formed by the augmented left road wheel angle $\theta_{AugRR}$ as a feedback signal for the road wheel control system 15 based on relative right road wheel angle $\theta_{RelRR}$ and initial value $\theta_{ShsRR}(0)$ of the absolute right road angle in summer 180. The augmented right road wheel angle $\theta_{AugRR}$ is fed to the road wheel control system 15 to generate a right road wheel tracking error based on the fed right road wheel angle $\theta_{AugRR}$ and its reference right road angle $\theta_{RRef}$. The right road wheel tracking error will be reduced to the required minimal error value by controlling of the road wheel control system 15 such that the right road wheel is initially synchronized and controlled.

Figure 5:
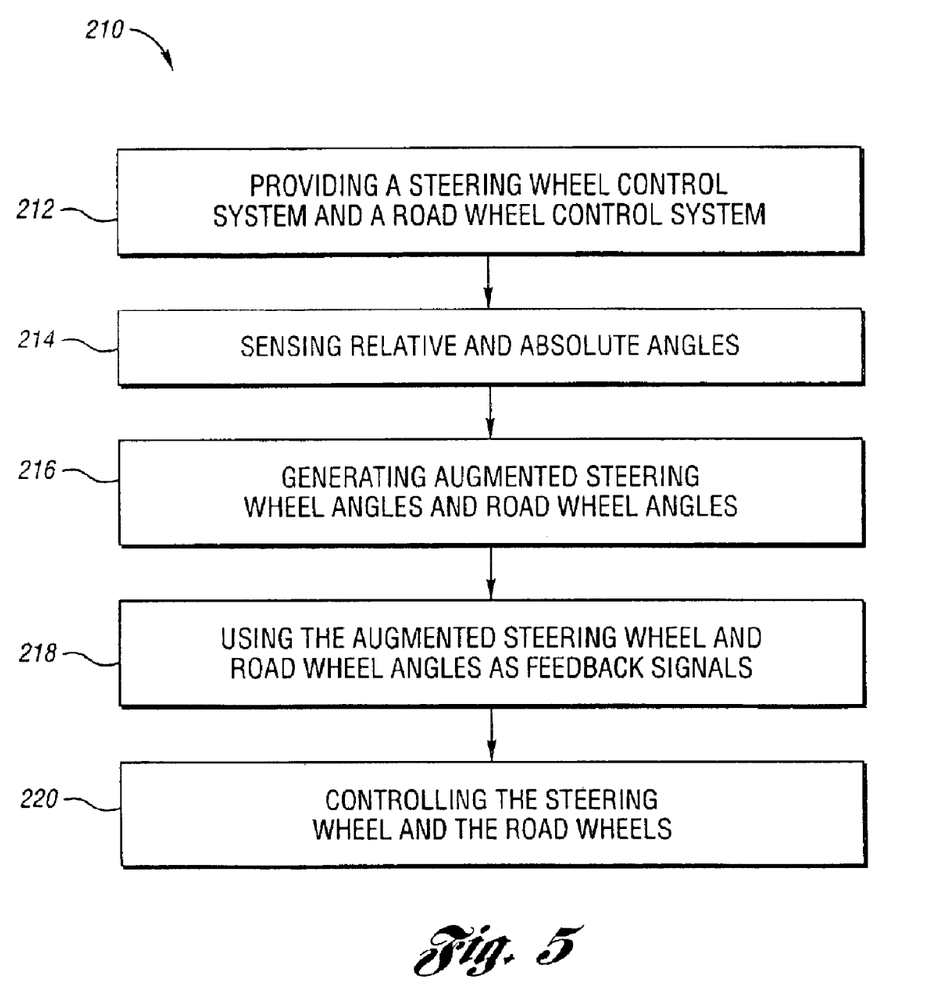
FIG. 5 is a flow chart of the initial synchronization strategy in accordance with one method of the present invention.

FIG. 5 illustrates one method 210 for initial synchronization of steering wheel and road wheels in a vehicle steer-by-wire system when the system is first powered. As shown, method 210 includes providing a steering wheel control system and a road wheel control system in box 212. As mentioned above, the steering wheel control system produces the steering feel to a vehicle driver and controls the steering wheel to track a steering wheel reference angle. The road wheel control system controls the road wheels to track road wheel reference angles and generates steering wheel and road wheel reference angles based on the steering wheel angle.

As shown in FIG. 5, method 210 further includes sensing relative angle and absolute angle of the steering wheel, relative and absolute angles of the left road wheel, and relative angle and initial value of the absolute angle of the right road wheel in box 214.

Method 210 further includes generating an augmented steering wheel angle based on the relative angle and initial value of the absolute angle of the steering wheel, generating an augmented right road wheel angle based on the relative angle and initial value of the absolute angle of the right road wheel, and generating an augmented left road wheel angle based on the relative angle and initial value of the absolute angle of the left road wheel in box 216. In this embodiment, generating the augmented steering wheel angle, the augmented left road wheel angle, and the augmented right road wheel angle includes executing the mathematical relationships in Equation (1).

In this embodiment, method 210 further includes using the augmented steering wheel angle as a feedback signal to the steering wheel control system and using the augmented left and right road wheel angles as feedback signals to the road wheel control system in box 218. The augmented steering wheel angle is fed to the steering wheel control system wherein the augmented steering wheel angle is compared with the reference steering wheel angle to produce the steering wheel tracking error. Moreover, the steering wheel angle is received by the road wheel reference angle generator to generate reference left and right road wheel reference angles. The augmented left and right road wheel angles are fed to the road wheel control system. Each of the augmented road wheel angles is compared with a respective road wheel reference angle wherein the augmented road wheel angle is compared with the reference road wheel angle to produce the road wheel tracking error.

Method 210 further includes controlling of the steering wheel control system and road wheel control system such that steering wheel and road wheel tracking errors are reduced to the required minimal error values to achieve the objective of initial synchronization of the steering wheel and the road wheels in box 220. In this embodiment, method 210 includes controlling the steering wheel and the road wheels for performing initial synchronization of the steering wheel and the road wheels for allowing the vehicle to be operable during the initial synchronization process. As a result, as initial synchronization occurs within the nominal control of steer-by-wire system, the driver of the vehicle may continue to operate the vehicle without a requirement of standing by for initial synchronization to end.

While the present invention has been described in terms of preferred embodiments, it will be understood, of course, that the invention is not limited thereto since modifications may be made to those skilled in the art, particularly in light of the foregoing teachings.

What is claim is:

1. A method for initial synchronization of steering wheel and road wheel angles in a steer-by-wire system of a vehicle when the steer-by-wire system is powered, the method comprising:

providing a steering wheel control system for producing the steering feel to a vehicle driver and for controlling the steering wheel to track a steering wheel reference angle;

providing a road wheel control system for generating road wheel reference angles and for controlling the road wheels to track road wheel reference angles;

sensing relative angle and absolute angle of the steering wheel, relative angle and absolute angle of the left road wheel, and relative angle and absolute angle of the right road wheel;

generating an augmented steering wheel angle based on the relative angle and the initial value of the absolute angle of the steering wheel, an augmented right road wheel angle based on the relative angle and the initial value of the absolute angle of the right road wheel, and an augmented left road wheel angle based on the relative angle and the initial value of the absolute angle of the left road wheel;

using the augmented steering wheel angle as a feedback signal to the steering wheel control system and the augmented left and right road wheel angles as feedback signals to the road wheel control system; and controlling the steering wheel and the road wheels for performing initial synchronization of the steering wheel and the road wheels.

2. The method of claim 1 wherein generating the augmented steering wheel angle, the augmented left road wheel angle, and the augmented right road wheel angle includes executing:

$$\theta_{AugS}=\theta_{RelS}+\theta_{AbsS}(0)$$
$$\theta_{AugLR}=\theta_{RelLR}+\theta_{AbsLR}(0)$$
$$\theta_{AugRR}=\theta_{RelRR}+\theta_{AbsRR}(0), \qquad (1)$$

where $\theta_{RelS}$, $\theta_{RelLR}$, and $\theta_{RelRR}$ are relative steering wheel and road wheel angles with zero initial values generally, $\theta_{AbsS}(0)$, $\theta_{AbsLR}(0)$, and $\theta_{SbsRR}(0)$ are the initial values of absolute steering wheel and road wheel angles at the beginning of initial synchronization, $\theta_{AugS}$, $\theta_{AugLR}$ and $\theta_{AugRR}$ are the augmented steering wheel angle and road wheel angles.

3. The method of claim 2 wherein the augmented steering wheel angle $\theta_{AugS}$, the augmented left road wheel angle $\theta_{AugLR}$ and the augmented right road wheel angle $\theta_{AugRR}$ are generated in the augmented signal generator based on Equation (1), the augmented steering wheel angle $\theta_{AugS}$ being generated based on relative angle $\theta_{RelS}$ and initial value $\theta_{AbsS}(0)$ of the absolute angle of the steering wheel, the augmented left road wheel angle $\theta_{AugLR}$ being generated based on relative angle $\theta_{RelLR}$ and initial value $\theta_{AbsLR}(0)$ of the absolute angle of the left road wheel, the augmented left road wheel angle $\theta_{AugRR}$ being generated based on the relative angle $\theta_{RelRR}$ and initial value $\theta_{SbsRR}(0)$ of the absolute angle of the right road wheel.

4. The method of claim 2 wherein the initial value of absolute angle for the steering wheel, the initial value of absolute angle for the left road wheel, and the initial value of absolute angle for the right road wheel are constant values which indicate the absolute angular positions of the steering wheel, the left road wheel, and the right road wheel, respectively, when the steer-by-wire system is first powered.

5. The method of claim 2 wherein the relative angle of the steering wheel, the relative angle of the left road wheel, and the relative angle of the right road wheel have zero initial value generally when the steer-by-wire system is first powered indicating the relative angular positions of the steering wheel, the left road wheel, and the right road wheel, respectively, during initial synchronization and nominal control of the steer-by-wire system.

6. The method of claim 1 wherein the steering wheel control system is a closed loop feedback control system for producing the steering feel to the vehicle driver, generating road wheel reference angles, and controlling the steering wheel to track the steering wheel reference angle.

7. The method of claim 1 wherein the road wheel control system is a closed loop feedback control system for controlling the road wheels to track the road wheel reference angles which are produced in the road wheel reference angle generator base on steering wheel angle, vehicle speed and other possible vehicle variables.

8. The method of claim 1 wherein the augmented steering wheel angle and road wheel angles are used directly as feedback signals to the steering wheel control system and road wheel control system.

9. The method of claim 8 wherein the augmented steering wheel angle is used as a feedback signal to the steering wheel feedback control system and the augmented left and right road wheel angles are used as feedback signals to the road wheel feedback control system.

10. The method of claim 9 wherein the augmented steering wheel angle indicates the actual steering wheel angle and the augmented left and right road wheel angles indicate the actual road wheel angles during initial synchronization and nominal control of the steer-by-wire system.

11. The method of claim 1 wherein the actual steering wheel angle tracks steering wheel reference angle in the steering wheel control system and actual road wheel angles track wheel reference angles in the road wheel control system.

12. The method of claim 1 wherein the steering wheel control system and road wheel control system control the steering wheel and road wheels to reduce the wheel tracking errors to facilitate initial synchronization between steering wheel and road wheels and between two road wheels and maintain the nominal control for the steer-by-wire control system.

13. A system for initial synchronization of steering wheel and road wheel angles in a vehicle steer-by-wire system when the steer-by-wire system is first powered, the system comprising:

a steering wheel control system for producing steering feel and controlling the steering wheel to track a steering wheel reference angle;

a road wheel control system for generating road wheel reference angles and for controlling the road wheels to track road wheel reference angles, the road wheel control system being in electrical communication with the steering wheel control system;

a sensing assembly for sensing relative angle and absolute angle of the steering wheel, relative angle and absolute angle of the left road wheel, and relative angle and absolute angle of the right road wheel; and an augmented signal generator for generating an augmented steering wheel angle based on the relative angle and initial value of the absolute angle of the steering wheel, and an augmented right road wheel angle based on the relative angle and initial value of the absolute angle of the right road wheel, and an augmented left road wheel angle based on the relative angle and initial value of the absolute angle of the left road wheel, wherein the steering wheel control system uses the augmented steering wheel angle as the actual steering wheel feedback signal and the road wheel control system uses the augmented left and right road wheel angles as actual road wheel feedback signals, wherein the steer-by-wire system controls the steering wheel and the road wheels based on the steering wheel feedback control system and the road wheel control system to perform initial synchronization of the steering wheel and the road wheels for allowing the vehicle to be operable during the initial synchronization.

14. The system of claim 13 wherein the an augmented signal generator generates the augmented steering wheel angle, the augmented right road wheel angle, and the augmented left road wheel angle by executing:

$$\theta_{AugS} = \theta_{RelS} + \theta_{AbsS}(0)$$

$$\theta_{AugLR} = \theta_{RelLR} + \theta_{AbsLR}(0)$$

$$\theta_{AugRR} = \theta_{RelRR} + \theta_{AbsRR}(0) \qquad (1)$$

wherein $\theta_{RelS}$, $\theta_{RelLR}$, and $\theta_{RelRR}$ are relative steering wheel and road wheel angles with zero initial values generally, $\theta_{AbsS}(0)$, $\theta_{AbsLR}(0)$, and $\theta_{SbsRR}(0)$ are initial values of absolute steering wheel and road wheel angles in the beginning of initial synchronization, $\theta_{AugS}$, $\theta_{AugLR}$ and $\theta_{AugRR}$ are augmented steering wheel angle and road wheel angles.

15. The system of claim 14 wherein the augmented steering wheel angle $\theta_{AugS}$, the augmented left road wheel angle $\theta_{AugLR}$ and the augmented right road wheel angle $\theta_{AugRR}$ are generated in the augmented signal generator based on Equation (1), the augmented steering wheel angle $\theta_{AugS}$ being generated based on relative angle $\theta_{RelS}$ and initial value $\theta_{AugS}(0)$ of the absolute angle of the steering wheel, the augmented left road wheel angle $\theta_{AugLR}$ being generated based on relative angle $\theta_{RelLR}$ and initial value $\theta_{AbsLR}(0)$ of the absolute angle of the left road wheel, the augmented left road wheel angle $\theta_{AugRR}$ being generated based on the relative angle $\theta_{RelRR}$ and initial value $\theta_{SbsRR}(0)$ of the absolute angle of the right road wheel.

16. The system of claim 14 wherein the initial value of absolute angle of the steering wheel, the initial value of absolute angle of the left road wheel, and the initial value of absolute angle of the right road wheel are constant values which indicate the absolute angular positions of the steering wheel, the left road wheel, and the right road wheel, respectively, when the steer-by-wire system is first powered.

17. The system of claim 14 wherein the relative angle of the steering wheel, the relative angle of the left road wheel, and the relative angle of the right road wheel have zero initial values generally when the steer-by-wire system is first powered and indicate the relative angular positions of the steering wheel, the left road wheel, and the right road wheel, respectively, during initial synchronization and nominal control of the steer-by-wire system.

18. The system of claim 13 wherein the steering wheel control system is a closed loop feedback control system for producing the steering feel to the vehicle driver, generating road wheel reference angles, and controlling the steering wheel to track the steering wheel reference angle.

19. The system of claim 13 wherein the road wheel control system is a closed loop feedback control system for controlling the road wheels to track the road wheel reference angles.

20. The system of claim 13 wherein the augmented steering wheel angle and road wheel angles are used directly as feedback signals to the steering wheel control system and road wheel control system.

21. The system of claim 20 wherein the augmented steering wheel angle is used as a feedback signal to the steering wheel feedback control system and the augmented left and right road wheel angles are used as feedback signals to the road wheel feedback control system.

22. The system of claim 21 wherein the augmented steering wheel angle indicates the actual steering wheel angle and the augmented left and right road wheel angles indicate the actual road wheel angles during initial synchronization and nominal control of the steer-by-wire system.

23. The system of claim 13 wherein the actual steering wheel angle tracks steering wheel reference angle in the steering wheel control system and actual road wheel angles track wheel reference angles in the road wheel control system.

24. The system of claim 13 wherein the steering wheel control system and road wheel control system control the steering wheel and road wheels to reduce the wheel tracking errors to facilitate initial synchronization between steering wheel and road wheels and between two road wheels and maintain the nominal control for the steer-by-wire control system.

25. The system of claim 13 wherein initially synchronizing the steering wheel and road wheels of a vehicle steer-by-wire system is time independent, driver interruptible and comfortable for occupants of the vehicle.

* * * * *